Nov. 27, 1956  S. WEBB  2,772,102
SEALED THREADED PIPE JOINT
Filed April 22, 1952  2 Sheets-Sheet 2
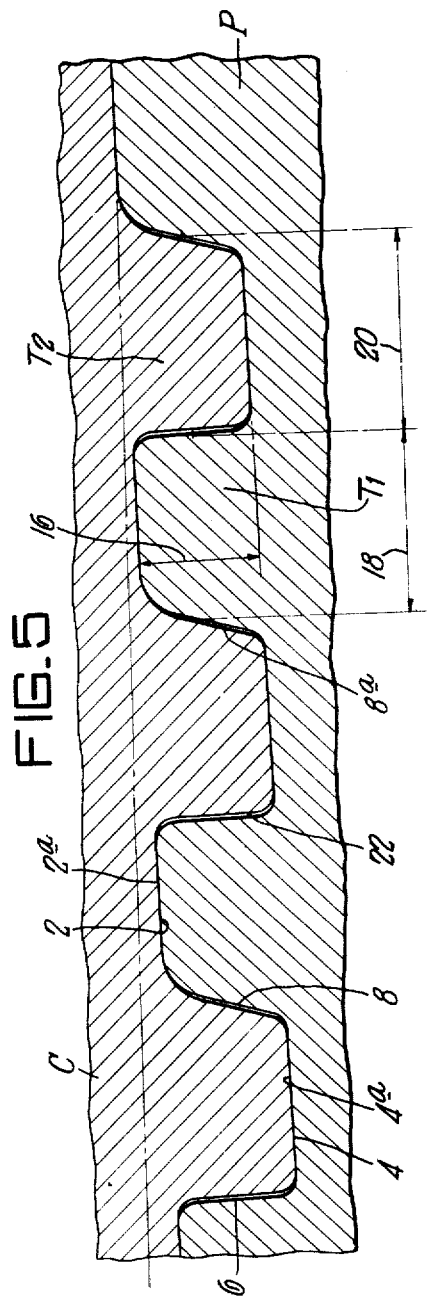
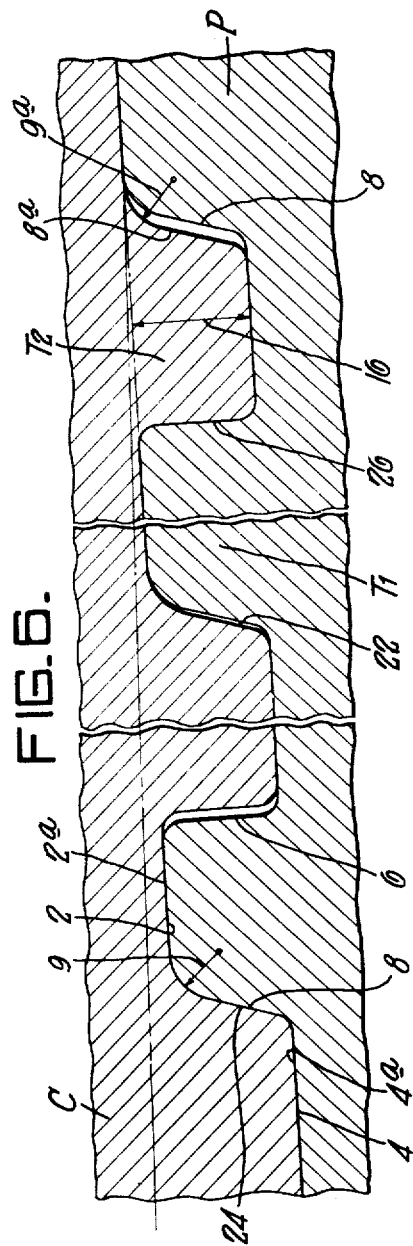
Inventor:
SAMUEL WEBB,
by: Donald G. Dalton
his Attorney.

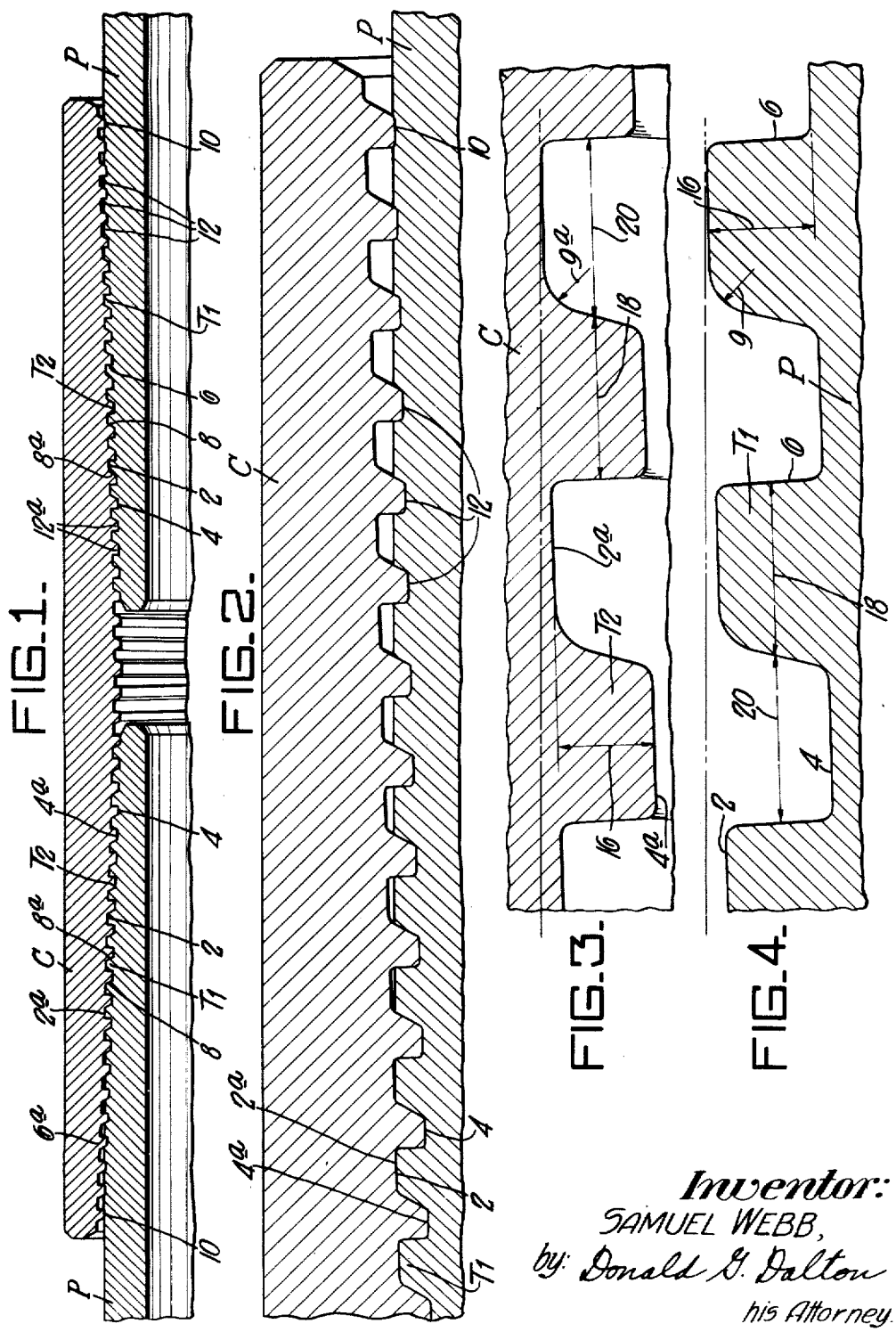

United States Patent Office 2,772,102
Patented Nov. 27, 1956

2,772,102

SEALED THREADED PIPE JOINT

Samuel Webb, Pleasant Hills, Pa., assignor to United States Steel Corporation, a corporation of New Jersey Application April 22, 1952, Serial No. 283,535

4 Claims. (Cl. 285—334)

This invention relates to threaded joints and more particularly to threaded joints for oil well casing and the like.

In the casing of deep wells, it is obvious that the threaded joints of the casing must bear tremendous loads. Consequently a joint which is as strong as the pipe, i. e., a joint that is 100% efficient is highly desirable. While 100% efficiency joints have been produced, such production has only been possible by special treatments such as upsetting the pipe ends to increase the wall thickness of the pipe at the threaded portion, cold-working and heat treatments. Without such treatments, which add materially to the cost of the casing, it has heretofore been impossible to produce threaded joints having over about 75% efficiency. There has also been a tendency for conventional joints to leak when subjected to high pressures when bearing heavy loads and it is imperative that the casing joints to not leak under such conditions.

It is accordingly an object of the present invention to produce a threaded joint design which is 100% efficient.

It is a further object of this invention to produce a high-efficiency threaded-joint which is fluid tight under high pressures.

The foregoing and further objects will become apparent from the following specification when read in conjunction with the attached drawings, wherein:

Figure 1 is a longitudinal cross section of a threaded-casing joint embodying the design of my invention;

Figure 2 is an enlarged cross section of an end of the joint;

Figure 3 is a detail of a coupling thread and groove;

Figure 4 is a detail of a pipe thread and groove;

Figure 5 is an enlarged cross section of the engaged threads; and

Figure 6 is an enlarged detail of threads showing flank bearing or seal.

Referring more particularly to the drawings, the letter P designates sections of oil well casing screw-threadedly connected together by a coupling C. As will be noted and more fully described hereinafter, the external threads $T_1$ on the pipe and the internal threads $T_2$ in the coupling have flat crests 2 and 4a and flat roots 4 and 2a, respectively, with the load-carrying flanks 6 and 6a substantially normal to the pipe axis. That is, these flanks are as close to normal as it is possible to obtain commercially when cutting the threads with chasers. The nonload-carrying flanks 8 and 8a may conveniently be sloped at a somewhat greater angle. To facilitate cutting and to minimize stress concentration, the corners of the crests and roots are rounded off. On the pipe thread, the corner 9 has a substantially large radius equal to somewhat less than one-half the thread height 16. This is to facilitate "stabbing" in the initial make-up of the joint. The root portion of the coupling thread has a co-mating corner 9a of like radius. Thus the pipe threads and the coupling threads have unlike profiles.

It will be noted that the entire thread $T_1$ is engaged, including the last shallow root convolution or "scratch" 10 on the pipe. Beyond the last scratch 10, the pipe surface is cylindrical, whereas the threaded area is sloping or conical in shape, the slope of the cone being dependent on the taper of the threads. It is thus seen that the roots 4 of the threads $T_1$ terminate in a line which is parallel throughout the length of the thread to a line defining the taper of the cone and that the crests 2 are parallel throughout a substantial portion of the length until, due to the taper, the crests of the thread coincide with the exterior of the pipe. This leaves a number of imperfect or vanishing threads 12, of less height than the fully formed or perfect threads 12a, the height of the vanishing threads constantly diminishing and terminating in the last scratch 10. The crests 4a and roots 2a of the coupling threads $T_2$ terminate in lines which are parallel to the root line of the pipe threads.

In order to obtain the desired 100% efficiency, it is necessary that the contacted portion of the crests and roots of the threads exceed a critical minimum width throughout the full length of the threads. Thus the minimum width of the flat portion of the crests 2 and roots 2a and roots 4 and crests 4a that are in contact should exceed the height 16 of the threads. Due to the crests and roots of the threads being flat, the height thereof can be sufficiently closely controlled during manufacture to insure contact between the crests and roots.

Moreover, in accordance with the teachings of my invention, the width 18 of the threads is purposely made smaller than the width 20 of the thread grooves whereby the crests and roots will come into contact during make-up of the joint prior to the flanks so that the crests and roots will thereby contact throughoutt he length of the fully formed or perfect threads and the crests of the coupling threads will contact the roots of the pipe threads throughout the full length of the threads including the last scratch of the vanishing threads.

I have further developed that such a thread or joint design will be fluid tight under the extreme pressures and loads developed in oil well use if one load-bearing flank 6 and one nonload-bearing flank 8, are in close contact with an oppositely disposed flank 6a and 8a, respectively, intermediate the length of the thread. The reason for this is that making the threads narrower than the grooves may leave a small spiral opening 22 throughout the threaded joint. However, by having contact as described, the spiral opening is in effect dammed up as at 24 and 26 so that no through passageway remains.

In order to insure contact of a flank 6 with 6a and 8 with 8a within the minimum engaged fully formed thread length 12a, I make the lead of the pipe or coupling threads faster or slower than the lead of the other by at least the amount the threads are narrower than the grooves.

In repeated tensile tests of threaded casing joints of the foregoing design, the pipe broke in every instance proving conclusively that the joint is over 100% efficient by reason of the joint design since in no instance was the pipe ends upset, cold worked or given any special treatment. Moreover, repeated hydraulic pressure tests have failed to disclose a single instance of such a joint leaking.

While I have shown and described a specific embodiment of my invention, it will be understood that this embodiment is merely for the purpose of illustration and description and that various other forms may be devised within the scope of my invention, as defined in the appended claims.

I claim:

1. A tapered non-upset, threaded pipe joint characterized by 100% efficiency resulting solely from the screw-threaded contact, said joint comprising an internally threaded coupling member and an externally threaded pipe end member, the threads on each member having load-bearing and nonload-bearing flanks when tensile stresses are applied to the joint, the combination of the pipe and coupling threads being substantially complementary and having flat crests and roots, the threads being narrower than the thread grooves, the load-bearing flanks of the pipe and coupling threads being substantially normal to the longitudinal axis of the pipe and coupling, the roots and crests of the coupling threads being parallel throughout the length thereof and the roots of the pipe threads being parallel throughout the length of the pipe threads providing a plurality of fully formed threads with vanishing threads at the junction with the unthreaded portion of the pipe, the crests of the coupling threads being parallel to the roots of the pipe threads and the roots of the coupling threads being parallel to the crests of the fully formed pipe threads, the mating threads on the coupling being at least as long as the total length of fully formed and vanishing threads on the pipe, the entire surface of the flat crests of the coupling threads being in engagement with the roots of the pipe threads throughout the full length of the fully formed and vanishing pipe threads, the entire surface of the flat crests of the pipe threads being in engagement with roots of the coupling threads throughout the full length of the fully formed threads on the pipe, and the threads of said joint having a difference in phase whereby a load-bearing flank of the pipe threads is in sealing engagement with a load-bearing flank of the coupling threads and a nonload-bearing flank of the pipe threads is in sealing engagement with a nonload-bearing flank of the coupling threads at points spaced apart a distance greater than the width of a fully formed thread but within the length of the fully formed threads.

2. A threaded joint as in claim 1, characterized by the crests and roots of the coupling threads and roots of the pipe threads being parallel to the thread taper.

3. A threaded casing joint as in claim 1, characterized by the length of crest and root engagement being greater than the height of the fully formed threads.

4. A threaded joint as in claim 1, characterized by the minimum crest and root engagement being greater than the height of the fully formed threads, and rounded corners on the crests and roots of the threads, the corners on the pipe thread crest and the coupling root adjacent the nonload-bearing flank having a substantially larger radius than that on the other corners of the threads, the said rounded corners on the pipe thread crests and coupling thread root adjacent the nonload-bearing flank having a radius less than one-half the thread depth.

References Cited in the file of this patent

UNITED STATES PATENTS

| | | |
|---|---|---|
| 929,027 | Schuhmann | July 27, 1909 |
| 1,766,635 | Holdaway | June 24, 1930 |
| 1,798,604 | Hoke | Mar. 31, 1931 |
| 1,817,808 | Eaton | Aug. 4, 1931 |
| 1,851,714 | McCullough | Mar. 29, 1932 |
| 2,177,100 | Frame | Oct. 24, 1939 |
| 2,204,754 | Frame | June 18, 1940 |
| 2,267,923 | Johnson | Dec. 30, 1941 |
| 2,454,137 | Claypool et al. | Nov. 16, 1948 |
| 2,505,747 | Willke | Apr. 25, 1950 |
| 2,636,753 | Griffin | Apr. 28, 1953 |

OTHER REFERENCES

Natl. Bu. of Stls. Handbook H-28 (1944), page 261.

Dedication 2,772,102.—*Samuel Webb*, Pleasant Hills, Pa. SEALED THREADED PIPE JOINT. Patent dated Nov. 27, 1956. Dedication filed Apr. 5, 1962, by the assignee, *United States Steel Corporation*.

Hereby dedicates said Letters Patent to the people of the United States.

[*Official Gazette May 22, 1962.*]